US008874669B2

(12) United States Patent
Bengtsson

(10) Patent No.: US 8,874,669 B2
(45) Date of Patent: Oct. 28, 2014

(54) SYNCHRONIZING MESSAGES ON CONNECTED DEVICES

(75) Inventor: Henrik Bengtsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 318 days.

(21) Appl. No.: 13/274,464

(22) Filed: Oct. 17, 2011

(65) Prior Publication Data

US 2013/0041959 A1 Feb. 14, 2013

Related U.S. Application Data

(60) Provisional application No. 61/522,771, filed on Aug. 12, 2011.

(51) Int. Cl.
*G06F 15/16* (2006.01)
*H04L 12/58* (2006.01)
*H04L 29/08* (2006.01)

(52) U.S. Cl.
CPC ............ *H04L 51/14* (2013.01); *H04L 67/1095* (2013.01); *H04L 51/38* (2013.01); *H04L 12/5895* (2013.01)
USPC ........... 709/206; 709/203; 709/205; 709/207; 709/248

(58) Field of Classification Search
USPC .......................... 709/203, 205, 206, 207, 248
See application file for complete search history.

(56) References Cited

U.S. PATENT DOCUMENTS 5,796,791 A * 8/1998 Polcyn ..................... 379/265.09
5,968,117 A * 10/1999 Schuetze ....................... 709/206
6,487,584 B1 * 11/2002 Bunney ......................... 709/206
6,577,231 B2 * 6/2003 Litwin et al. .................. 375/356
6,779,022 B1 * 8/2004 Horstmann et al. .......... 709/206
7,330,731 B2 * 2/2008 Hymel .......................... 455/461
7,502,335 B2 * 3/2009 Lin ............................... 370/278
8,280,354 B2 * 10/2012 Smith et al. ................ 455/414.1
8,386,773 B2 * 2/2013 Sherkin et al. ................ 713/155

(Continued)

FOREIGN PATENT DOCUMENTS

EP  1343103 A2  9/2003
JP  2002244979 A  8/2002

OTHER PUBLICATIONS

Maes C Kuang R Lima R Cromwell E Chiu J Day R Ahad Oracle Corporation Wook-Hyun Jeong Samsung Electronics Co S H et al: "Push Extensions to the IMAP Protocol (P-IMAP); draft-maes-lemonade-p-imap-12.txt", dated Mar. 1, 2006, XP015044355, ISSN: 0000-0004.

(Continued)

*Primary Examiner* — Michael Y Won
(74) *Attorney, Agent, or Firm* — Renner, Otto, Boisselle & Sklar, LLP

(57) ABSTRACT

A method, system and computer program directed to synchronizing messages of an associated user that uses a plurality of electronic devices to receive messages, wherein each of the electronic devices utilizes a common messaging application. If two phone with two different phone numbers, both use the same app for sending and receiving messages and communication with a unique device identifier (e.g., telephone number, MSIDSN, etc.) as the address identity, all information such as messages and more can be synchronized in a secure way between the phones and applications if both applications are registered with the same secure identity on a messaging application server.

15 Claims, 7 Drawing Sheets

(56) References Cited

U.S. PATENT DOCUMENTS

| | | |
|---|---|---|
| 8,451,751 B2* | 5/2013 | Challapali et al. ............ 370/254 |
| 2002/0049640 A1* | 4/2002 | Sheriff et al. .................... 705/26 |
| 2004/0058710 A1* | 3/2004 | Timmins et al. ............. 455/560 |
| 2004/0064516 A1* | 4/2004 | Tsuboi et al. ................. 709/206 |
| 2005/0004992 A1* | 1/2005 | Horstmann et al. .......... 709/206 |
| 2005/0251411 A1* | 11/2005 | Ishii et al. ......................... 705/1 |
| 2007/0094334 A1* | 4/2007 | Hoffman et al. ............. 709/206 |
| 2007/0260751 A1* | 11/2007 | Meesseman ................. 709/248 |
| 2008/0208980 A1* | 8/2008 | Champan et al. ............ 709/206 |
| 2010/0271948 A1* | 10/2010 | Challapali et al. ............ 370/235 |
| 2011/0106880 A1* | 5/2011 | Strong et al. ................. 709/203 |
| 2012/0115473 A1* | 5/2012 | Kho et al. .................. 455/435.1 |
| 2012/0221655 A1* | 8/2012 | Lu et al. ........................ 709/206 |
| 2012/0242450 A1* | 9/2012 | Brohez ........................... 340/1.1 |
| 2013/0041959 A1* | 2/2013 | Bengtsson .................... 709/206 |
| 2013/0173715 A1* | 7/2013 | Song et al. .................... 709/205 |

OTHER PUBLICATIONS

Maes C Wilson S H: "Lemonade Server to Client Notifications; draft-ietf-lemonade-server-to-client-notifications-00.txt", dated Jul. 1, 2004, XP015022391, ISSN: 0000-0004.

Extended European Search Report dated Oct. 25, 2012 corresponding to European application No. 12179996.9 filed Aug. 10, 2012.

* cited by examiner

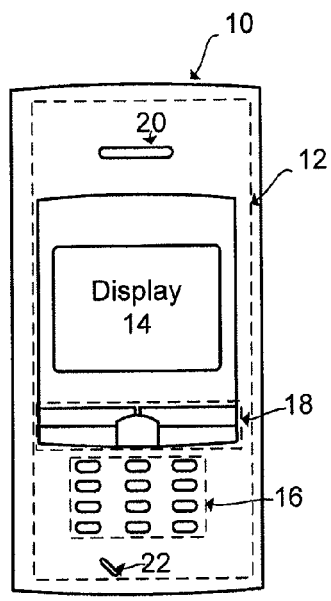
Figure 1
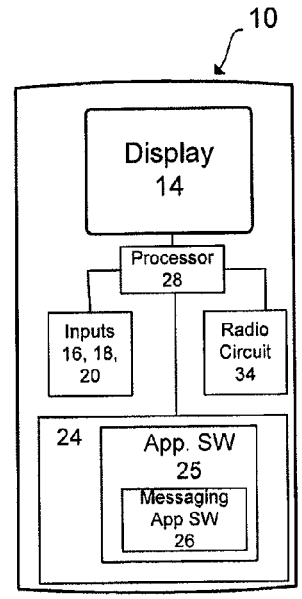
Figure 2
| Unique User Identifier | Sync | Unique Device Identifier | Unique Device Identifier | Unique Device Identifier |
|---|---|---|---|---|
| user@gmail.com | Y | 330 987-1234 | 216 621-1113 | |
| xyz@facebook.com | | 440 123-5678 | | |
| abc@yahoo.com | Y | 525 696-3427 | 647 111-1111 | 647 121-8888 |
| * | * | * | * | * |
| * | * | * | * | * |
| wxy@gmail.com | N | 123 987-6543 | 867 530-9121 | * |
| * | * | * | | |
| hij@gmail.com | | 908 578-9012 | | |
120
Figure 5

SYNCHRONIZING MESSAGES ON CONNECTED DEVICES

RELATED APPLICATION DATA

The present application claims the benefit of U.S. Provisional Application Ser. No. 61/522,771, filed Aug. 12, 2011, the disclosure of which is herein incorporated by reference in its entirety.

TECHNICAL FIELD OF THE INVENTION

The present invention relates to a system and method for synchronizing messages of an associated user that uses a plurality of electronic devices to receive and/or transmit messages, wherein each of the electronic devices utilizes a common messaging application.

DESCRIPTION OF THE RELATED ART

It is common for consumers to utilize multiple electronic devices for communication. For example, it is common for a consumer to have a mobile telephone for work related purposes and a mobile telephone for personal use. In addition, with the advent of tablet computers, many consumers now utilize a mobile telephone and the tablet device for communication purposes.

One problem with a user using multiple electronic devices is that the messages sent to one electronic device are not sent to the other devices. For example, if User A desires to transmit a message (e.g., a short message service (SMS) message) to User B, such message will be directed to the telephone number associated with the electronic device of User B. As such, the message only reaches the electronic device having the telephone numbered addressed in the message. In other words, if User B has multiple electronic devices with different telephone numbers, User A would have to send several messages (or add the contact information for all of User B's telephone numbers in a single message) to reach all of User B's electronic devices.

SUMMARY

The above identified problems are overcome by aspects of the present invention. One aspect of the present invention is directed to synchronizing messages of an associated user that uses a plurality of electronic devices to receive messages, wherein each of the electronic devices utilizes a common messaging application.

Another aspect of the invention relates to a method for synchronizing messages between a first electronic device and a second electronic device, wherein each device is accessed by an associated user, the method including: receiving a first unique device identifier associated with the first electronic device at a messaging server; receiving registration information associated with the associated user of the first electronic device, wherein the registration information includes a unique user identifier associated with the user of the first electronic device at the messaging server; storing the first unique device identifier and the unique user identifier in a storage device at the messaging server; receiving a second unique device identifier associated with the second electronic device and receiving registration information associated with the second electronic device, wherein the registration includes the unique user identifier associated with the user of the second electronic device at the messaging server; determining at the messaging server whether the first electronic device and the second electronic share the unique user identifier, wherein if the first electronic device and the second electronic device share the unique user identifier, the unique device identifier associated with the second device is linked to the unique device identifier and the unique user identifier associated with the first electronic device and stored at the messaging server; and synchronizing messages intended for the first electronic device or the second electronic device.

Another aspect of the invention relates to at least one of the first unique device identifier and the second unique device identifier being automatically transmitted to the messaging server without user input.

Another aspect of the invention relates to at least one of the first unique device identifier and the second unique device identifier being manually entered by the associated user and transmitted to the messaging server.

Another aspect of the invention relates to at least one of the first unique device identifier and the second unique device identifier being telephone numbers.

Another aspect of the invention relates to at least one first unique device identifier and the second unique device identifier includes one selected from a group consisting of International Mobile Equipment Identity (IMEI) number or an Integrated Circuit Card ID (ICCID) number.

Another aspect of the invention relates to the unique user identifier being automatically transmitted to the messaging server without user input.

Another aspect of the invention relates to the unique user identifier being manually entered by an associated user transmitted to the messaging server.

Another aspect of the invention relates to the unique user identifier being a verified identification associated with the associated user.

Another aspect of the invention relates to further including receiving a message from another electronic device intended to be delivered to the first electronic device or the second electronic device and transmitting the message to the first electronic device and the second electronic device.

Another aspect of the invention relates to receiving a delete message command corresponding to a delivered message from the first electronic device or the second electronic device and deleting the message from a message queue associated with the first electronic device and the second electronic device.

Another aspect of the invention relates to the step of determining includes comparing the unique user identifier associated with the first electronic device and the second electronic device.

Another aspect of the invention relates to prior to the step of synchronizing messages, a query is displayed on a display of the second electronic device to the associated user, wherein the query requests whether the associated user desires to synchronize messages at second electronic device with the first electronic device.

Another aspect of the invention relates to the application server receives user information indicative of the user's response to the query and stores a suitable indication on the messaging served linked with the user's unique user identification associated with the user.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes all equipment such as portable communication devices, mobile telephones, pagers, communicators, electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 1 and 2 are exemplary schematic diagrams illustrating electronic devices in accordance with aspects of the present invention.

FIG. 5 is an exemplary database in accordance with aspects of the present invention.

DETAILED DESCRIPTION OF EMBODIMENTS

Figure 3:
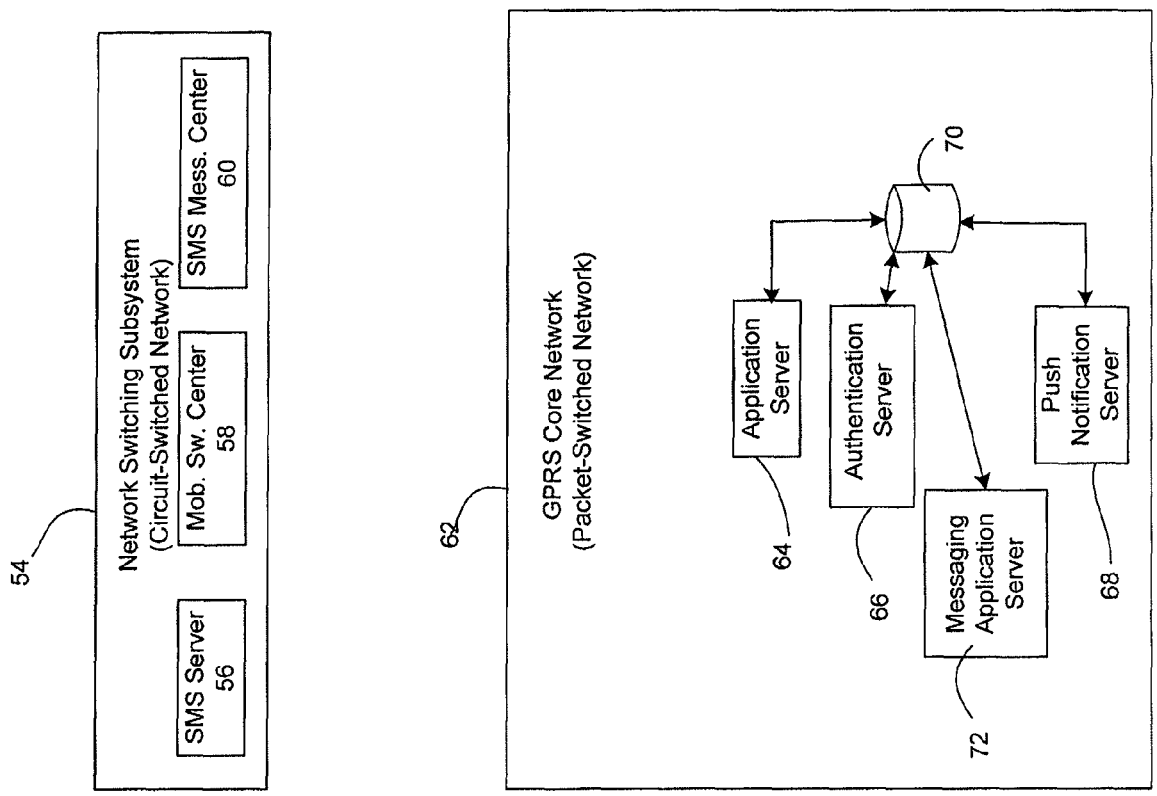
FIG. 3 is an exemplary network configuration in accordance with aspects of the present invention.
Figure 3:
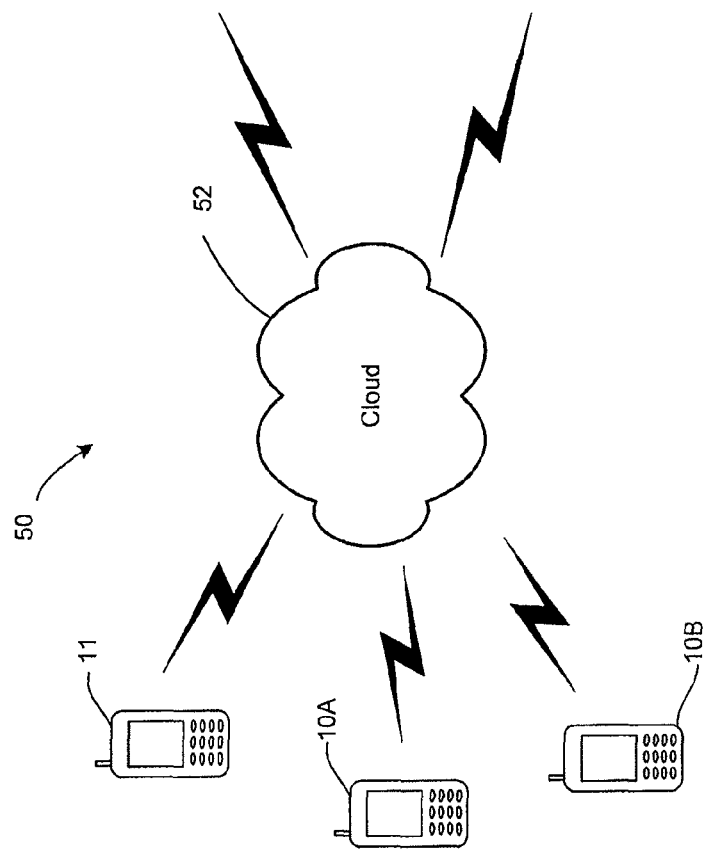

One aspect of the present invention is directed to synchronizing messages of an associated user that uses a plurality of electronic devices. wherein each of the electronic devices has a unique address for directing messages to the device and each device also utilizes a common messaging application. For example, a user may use two mobile telephones for communication purposes and each of the mobile telephones have a different telephone number, as is conventional. In addition, both mobile telephones utilize the same messaging application (e.g., Hanashi) for sending and receiving messages with other devices. Furthermore, each of the mobile telephones communicate with a unique device identifier (e.g., telephone number, MSIDSN, etc.) as the address identity. All information exchanged between the mobile telephones, such as messages and more can be synchronized in a secure manner if the applications stored on each mobile telephone are registered with the same secure identity at a messaging application server. A secure user identity may be obtained from an open authentication (OATH)-based source, such as Gmail, Facebook, twitter and yahoo, etc.

An exemplary electronic device 10 is illustrated in FIG. 1. Aspects of this invention are described primarily in the context of a mobile telephone. However, it will be appreciated that the invention is not intended to relate solely to mobile telephones and can relate to any type of electronic device. Other types of electronic equipment that may benefit from aspects of the present invention include personal computers, personal digital assistants, portable communication devices, tablets, etc.

As illustrated in FIG. 1, the electronic device 10 may include a user interface 12 that enables the user easily and efficiently to perform one or more communication tasks (e.g., enter a telephone number, identify a contact, select a contact, make a telephone call, receive a telephone call, look up a telephone number, enter a text message, receive text message, enter user input information, etc). The user interface 12 of the electronic device 10 generally includes one or more of the following components: a display 14, an alphanumeric keypad 16, function keys 18, a navigation tool 19, a speaker 20, and a microphone 22. In one embodiment, the display 14 may be configured to display one or more queries to facilitate user interaction with the electronic device 10.

As shown in FIG. 2, the electronic device 10 further includes one or more storage devices 24 (e.g., RAM, ROM, etc.) capable of storing application software 25. For example, the application software may include computer executable code that supports short message service, messaging applications, Internet data services, voice services, and multimedia services. In addition, the storage device 24 further includes messaging application software 26, which functions as messaging application platform to facilitate message communication between electronic devices, as well as synchronization of messages between a plurality electronic devices used a by a user in both packet-switched networks and circuit-switched networks through a messaging application server, for example. Additional discussion related to the messaging application software 26 and the messaging application server are provided below.

The storage device 24 is generally coupled to a processor 28. The processor 28 is programmed to perform the functionality described herein, for example, running the messaging application software 26 creating messages for transmission in a packet-switched network, receiving and transmitting such messages, creating SMS messages, transmitting SMS messages, receiving SMS messages, transmitting requests, configuring the electronic equipment for communications in various network environments, querying the user to enter information, etc., based on user information and/or commands input by the associated user to the electronic device 10.

The processor 28 also is coupled to conventional input devices (e.g., alphanumeric keypad 16, function keys 18, microphone 22, etc.), and to the display 14 and the speaker 20. The user interface 12 facilitates controlling operation of the electronic device 10 including initiating and conducting telephone calls and other communications (e.g., SMS communications, Internet communications, etc.).

The user interface 12 is also one mechanism for the user or operator of the electronic device 10 to enter characters, letters, words and/or expressions for use by one or more of the applications 26. For example, the user input devices may be any input device that allows a user to enter information (e.g., symbols, alphanumeric characters, words, phrases, graphic images, text images, etc.) into the electronic device 10.

The processor 28 also is coupled to a radio circuit 34. The radio circuit 34 may be used to establish communication in circuit-switched networks (e.g., for voice services, SMS, etc.) and also in packet-switched networks (e.g., VoIP, data services, chat sessions, etc.). The radio circuit 34 may be a single integrated circuit that includes circuitry for communications in circuit-switched networks and packet-switched networks. One of ordinary skill in the art will readily appreciate that while the radio circuit 34 is depicted in a single box, one or more circuits may be used to perform the functionality described herein. Furthermore, to simplify illustration, the radio circuit 34 is illustrated a single box that facilitates communication in circuit-switched and packet-switched networks, for example.

An exemplary system 50 in accordance with aspects of the present invention is illustrated in FIG. 3. The system 50 includes electronic devices 10A, 10B and 11. The electronic devices 10A, 10B and 11 may include their own unique device identifiers, which may be any desirable identifier that may be used to address the device individually in the system. Suitable unique device identifiers include, for example, a mobile subscriber integrated services digital network number (MSISDN), International Mobile Equipment Identity (IMEI) number, an Integrated Circuit Card ID (ICCID) number, etc.

The electronic devices 10A, 10B and 11 are configured to communicate with each other through the cloud 52, which is descriptive of a base station subsystem. The base station subsystem is a section of a mobile telephone network that is responsible for handling traffic and signaling between a mobile devices and the network switching subsystem (NSS) 54. The base station subsystem generally carries out transcoding of speech channels, allocation of radio channels to electronic devices (e.g., mobile phones), paging, quality management of transmission and reception over the air interface and other tasks related to the radio network. The cloud 52 is generally capable of receiving circuit-switched information and is also equipped to handle packet-switched information (e.g., for maintaining a constantly open IP-connection between electronic devices and a server). The cloud 52 is generally able to receive information from electronic devices 10A, 10B, 11 and transmit information destined to the electronic devices 10A, 10B, 11.

Circuit-switched information received is generally routed to the NSS 54. Such information includes voice communication, SMS, etc. The NSS 54 carries out switching functions and manages the communications between mobile phones and the public switched telephone network (PSTN). The NSS 54 is generally controlled by mobile telephone operators and allows mobile telephones to communicate with each other and telephones in the wider telecommunications network. The NSS 54 refers to the circuit-switched core network, used for traditional GSM services such as voice calls, SMS, and circuit switched data calls (e.g., non-TCP/IP data calls). One of ordinary skill in the art will readily appreciate that the NSS 54 includes such network components as, for example, a SMS server 56, mobile switching center (58), short message service center (60), etc, as is conventional. One of ordinary skill in the art will appreciate that one or more of these servers may be combined.

The communication system 50 further includes a packet-switched network 62 that provides mobility management, session management and transport for Internet Protocol (IP) packet services. In a GSM network, the packet-switched network 62 includes the general packet radio services (GPRS) core network. As used herein, packet-switched means that multiple users share the same transmission channel, only transmitting when they have data to send. Thus the total available bandwidth can be immediately dedicated to those users who are actually sending at any given moment, providing higher use where users only send or receive data intermittently. Web browsing, receiving electronic mails as they arrive and instant messaging are examples of uses that require intermittent data transfers, which benefit from sharing the available bandwidth. By contrast, in circuit-switched connections, a connection establishes a circuit, and reserves the full bandwidth of that circuit during the lifetime of the connection. Usually, GPRS data are billed per kilobyte of information transferred, while circuit-switched data connections are billed per second. The latter is because even when no data is being transferred, the bandwidth is unavailable to other potential users.

The electronic devices 10A, 10B, 11 may interact with each other and/or the various network types in accordance with any suitable communication standard, including, but not limited to, Short Message Service (SMS), Advanced Mobile Phone Service (AMPS), Digital Advanced Mobile Phone Service (D-AMPS), Global System for Mobile Communications (GSM), Code Division Multiple Access (CDMA), voice-over-IP (VoIP), wireless local area network (WLAN), Bluetooth or the like. In other words, the communication system 50 is illustrated in FIG. 3 for purposes of explaining aspects of the present invention, without limiting the invention to a particular communication system design, architecture or communication standard.

The packet-switched network 62 includes one or more application servers 64, an authentication server 66, a push notification server 68 and a storage device 70, such as a memory or disk drive for storing data accessible or otherwise usable by the application servers 64. The application servers 64 may be computer servers that serve a variety of functions in the communication system 50. For example, one or more of the application servers may provide routing of TCP/IP information, packets, electronic mail, VoIP, Internet browsing, etc.

In addition, one of the application servers may be a messaging application server 72. The messaging application server 72 coordinates the exchange of messages (e.g., SMS messages, electronic mail messages, multimedia messages, etc) discussed herein and provides the necessary signaling to carry out aspects of present invention. Such signaling includes providing message synchronization functions between electronic devices having a common user and a shared unique user identifier.

The push notification server 68 is configured to provide push notification service to selective electronic devices. Exemplary push notification services are Push Notification Service provided by Apple and Android Cloud to Device Messaging (C2DM). These services enable developers to send data from servers to their applications on Android devices. The service provides a mechanism that servers can use to tell mobile applications to contact the server directly, to fetch updated application or user data, for example. The push notification service handles all aspects of queuing of messages and delivery to the target application running on the target device. An application on an Android and/or Apple device does not need to be always connected to the messaging application server 72 to receive messages. The system, through the push notification server 68 will wake-up the messaging application on the electronic via an Internet broadcast when the message arrives, for example.

As noted above, the electronic devices 10A, 10B and 11 are capable of sending messages through a SMS message over a circuit-switched network and also chat over a packet-switched network. Typically, when a user desires to enter a text message, the user activates an application (e.g., messaging application 26) locally stored in the electronic device and the application initiates a messaging service. One of ordinary skill in the art will readily appreciate that the various manufacturers of electronic equipment may provide different mechanisms (e.g., hardware and/or software) in order to activate a suitable messaging service on electronic devices.

Figure 4:
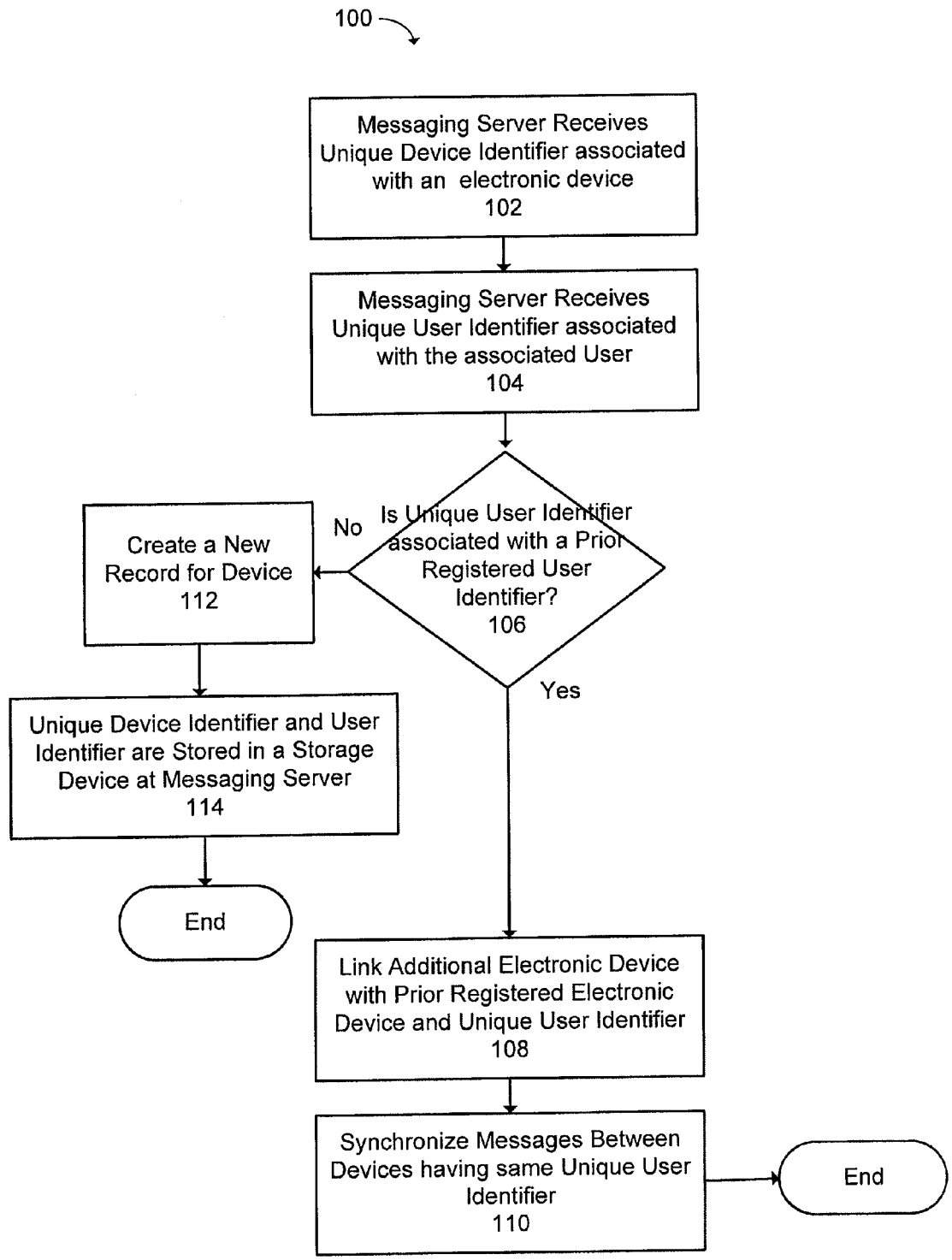
FIG. 4 is an exemplary method in accordance with aspects of the present invention.

Referring to FIG. 4, an exemplary method 100 for synchronizing messages between a first electronic device (e.g., electronic device 10A) and a second electronic device (e.g., electronic device 10B), wherein each device is accessed by an associated user, is illustrated. Method 100 generally occurs whenever an electronic device downloads the messaging application 26. At block 102, the messaging server receives a unique device identifier associated with an electronic device. The unique device identifier may be automatically transmitted to the messaging server or manually entered by the user and transmitted to the messaging server, for example. As discussed above, exemplary unique device identifiers include, for example, a mobile subscriber integrated services digital network number (MSISDN), International Mobile Equipment Identity (IMEI) number, an Integrated Circuit Card ID (ICCID) number, etc.

At block 104, the messaging server also receives registration information associated with the associated user of the first electronic device. Such registration information may be any desired type of registration information. The registration information includes a unique user identifier associated with the user of the first electronic device. Preferably, the unique user identifier is a secure identity. For example, the unique user identifier may be any type of open authentication (e.g. OATH) identity, including for example user names for Facebook, Twitter, Google, Yahoo, Apple, etc. Like the unique device identifier above, the unique user identifier may be automatically transmitted to the messaging server or manually entered by the user and transmitted to the messaging server, for example.

At block 106, the messaging application server 72 determines whether the electronic device shares a unique user identifier with any of the other prior registered electronic devices. Block 106 may be performed in a number of different ways. In one embodiment, the messaging application server 72 is communicatively coupled a database 120, which may be stored in the messaging application 72 or in a device coupled to the messaging application server 72 (e.g., storage device 70). The database 120 includes a plurality of rows, one for each unique user identifier, for example. Each row is considered "linked", such that by searching for a unique user identifier or unique device identifier, other information associated with the identifier being searched may be located, as described below. The database 120 may include a plurality of columns. The columns may relate to features (e.g., whether synchronization is desired (e.g., column 2) or other information (e.g., unique device identifiers (e.g., columns 3-5), for example. The database 120 is exemplary in nature and not intended to limit the claimed invention.

Thus, the received the unique user identifier may be compared to other prior registered unique user identifiers to determine if there is a match. If the electronic device and a prior registered electronic device share the unique user identifier (e.g., the user has previously registered a device), process flow moves to block 108.

At block 108, the unique device identifier associated with the electronic device is linked to the unique device identifier and the unique user identifier associated with the prior registered device and stored at the messaging application server 72.

Process flow then moves to block 110. At block 110, the messaging application server 72 is operative to synchronize messages intended for the first electronic device or the second electronic device. For example, referring to FIG. 5, if a message is transmitted through the message application 26 to the message application server 72 directed to 330-987-1234, the message application server 72 determines that the received message is directed to a user that utilizes two electronic devices and the user would like messages synchronized. Accordingly, the server transmits the received message to the corresponding electronic devices addressed to the device's unique device identifiers (e.g., 330-987-1234 and 216-621-1113), as shown in row one of database 120.

Likewise, if a message is directed to 440-123-5678, the message application server 72 determines that the user associated with xyz@facebook.com only utilizes a single electronic device. Therefore, the message application server 72 transmits the message to the device addressed by 440-123-5678. If a message is directed to 647-121-8888, the message application server 72 determines that the user corresponding to abc@yahoo.com utilizes three electronic devices and desires synchronization between the devices. Accordingly, the message application server 72 transmits the message to each of the addresses for the corresponding electronic devices (e.g., 525-696-3427; 647 111-1111; and 647-121-8888). If a message is directed to 867-530-9121, the message application server 72 determines that the user corresponding to wxy@gmail.com utilizes two electronic devices, but does not desire synchronization. Accordingly, the message application server 72 transmits the message to the device addressed by 867-530-9121.

A person of ordinary skill in the art will appreciate that one or more queries may be presented to the user to customize use of the messaging application 26. For example, prior to synchronizing messages to electronic devices linked to a common unique user identifier, a query may be presented to the user to determine if the user desires such synchronization.

Referring back to block 106, if the unique user identifiers are different (e.g., the unique user identifier is has not been previously stored in the database 120), then a new record may be created for the electronic device, as indicated at block 112. For example, a new record in the form of a new row in the database 120 may be created. Such a record may include the unique user identifier and the unique device identifier associated with the electronic device, which is then stored in the database 120, as illustrated at block 114.

An exemplary graphical user interface incorporating aspects of the present invention is illustrated in FIGS. 6-9. For purposes of this disclosure, it will be assumed that the graphical user interface is presented on displays 14 of the electronic devices 10A, 10B, 11. Further, it will be assumed that the electronic devices have already downloaded the communication application 26. The download may occur through an Android or Apple Marketplace, for example, or any other suitable manner.

Figure 6:
FIGS. 6-9 are exemplary graphical user interfaces for use in connection with aspects of the present invention.

Referring to FIG. 6, the messaging application 26 is installed on the electronic device 10A, for example. The unique device identifier associated with electronic device 10A may be automatically transmitted to the messaging application server 72 and/or manually entered and subsequently transmitted to the messaging application server 72. As illustrated in FIG. 6, the user of electronic device 10A may be prompted to register the electronic device through a verified identity. Exemplary OATH identity sources are provided by Google (e.g., Gmail), Facebook, Apple, Twitter, etc.). For purposes of FIG. 6, it will be assumed that the user only has one electronic device utilizing the messaging application 26, at this time.

Figure 7:
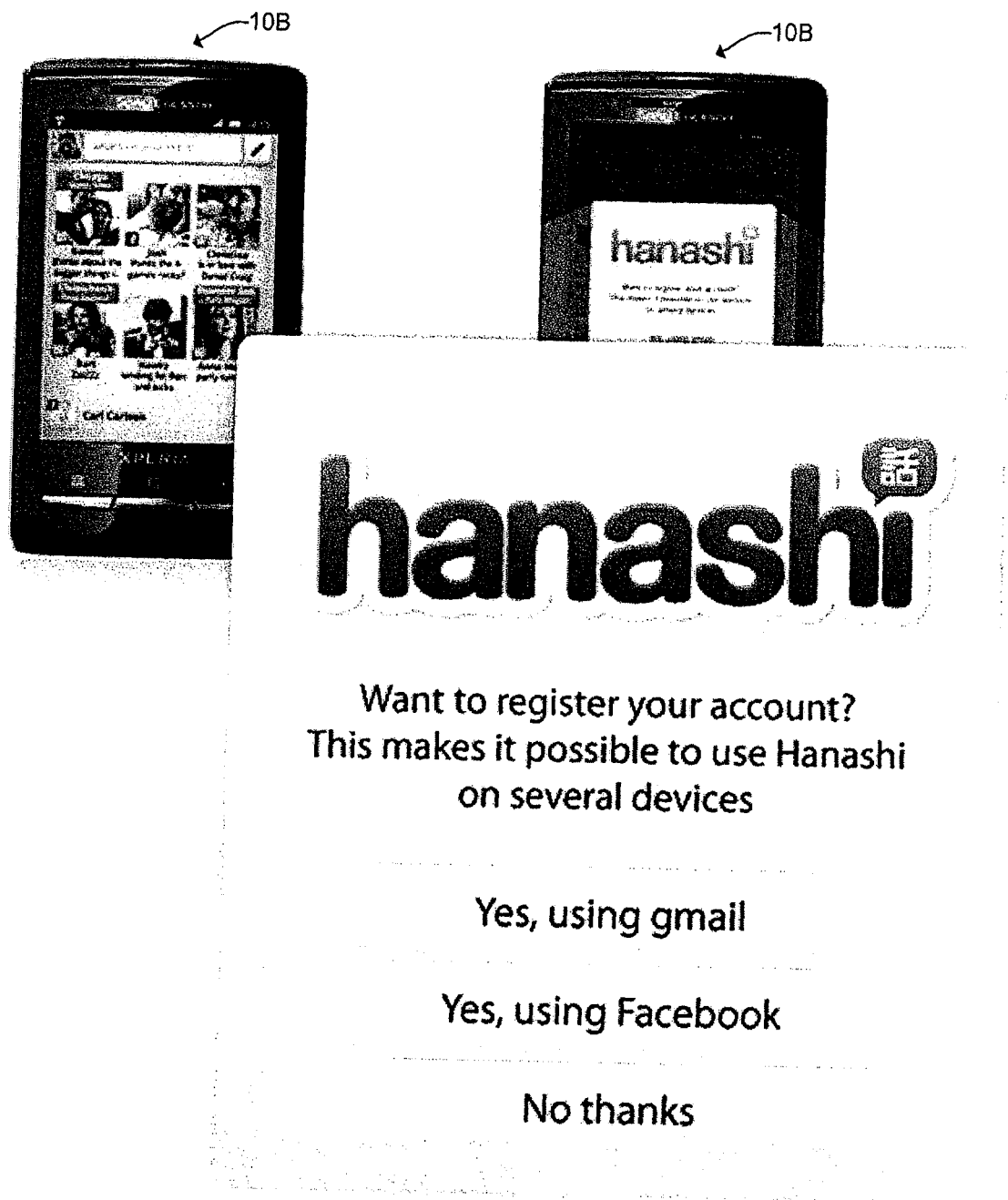

Referring to FIG. 7, when the messaging application 26 is installed on the second electronic device 10B, the unique device identifier associated with the electronic device 10B is provided to the messaging application server 72, as discussed above for the first electronic device. Again, this may occur automatically without user interaction or the user may be prompted to register with the messaging application 72, as discussed above using a secure identity (e.g., OATH identity).

Figure 8:
Figure 9:
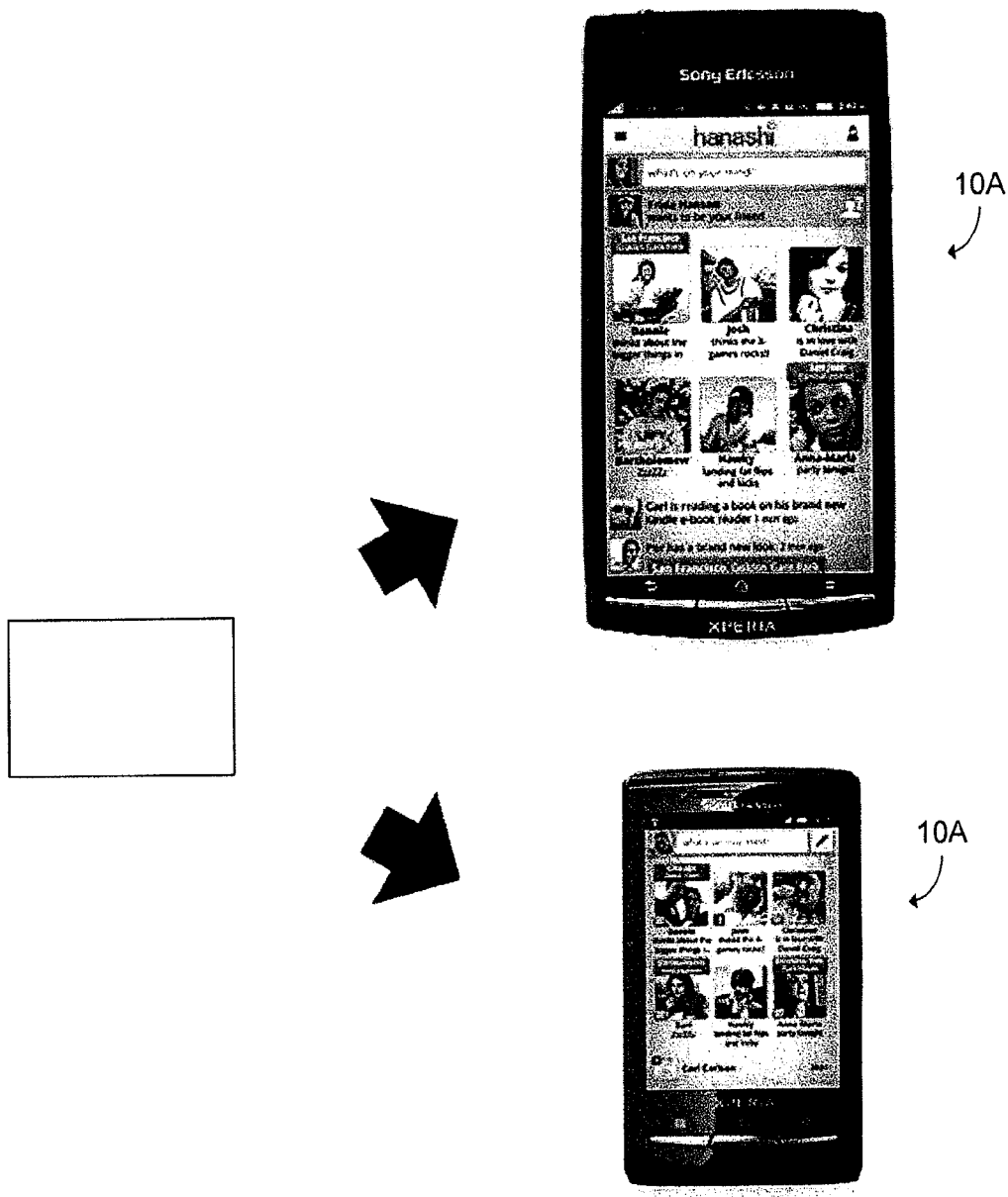

Referring to FIG. 8, if the user enters the same unique user identification that was previously registered and stored in the messaging application server 72 (e.g., in database 120) (as determined by the messaging application server 72), the user will be prompted to determine if messages should be sent to both electronic devices. For example, the display may read as follows: "This Gmail is already connected to a Hanashi account." "Do you want to use the same Hanashi on this phone?" The response is transmitted to the server and the server may store the response in database 120, for example. If the user selects "no", then messages will not be synchronized. If the user selects "yes", the messages will be synchronized on both devices. That is, a message addressed to one device, will now be sent to all electronic devices associated with the user, as illustrated in FIG. 9. For example, when a message addressed to electronic device 10B is sent from electronic device 11, the message will be sent to electronic devices 10A and 10B, since the devices are linked at the server and the recipient intends to have the messages directed to one electronic device sent to all linked devices. Likewise, once a message is deleted (through a delete command entered by the user) from one electronic device (e.g., electronic device 10A), the message will also be deleted on the linked electronic device (e.g., electronic device 10B). Thus, the messages will be synchronized such that the same information (e.g., messages, etc.) may be identical in both devices, for example.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A method of communicating messages to a first electronic device and a second electronic device that are accessed by a common user and each have a different messaging address, the method comprising:
   receiving a first unique device identifier associated with the first electronic device at a messaging server, the first electronic device having a first messaging address unique to the first electronic device and used to transmit messages to the first electronic device,
   receiving registration information associated with the user, wherein the registration information includes a unique user identifier associated with the user at the messaging server;
   storing the first unique device identifier, the unique user identifier and a relationship between the first unique device identifier and the unique user identifier in a storage device at the messaging server, wherein the relationship is configured as a one-to-many relationship in which the one in the relationship is the unique user identifier and the many in the relationship is one or more unique device identifiers;
   receiving a second unique device identifier associated with the second electronic device and receiving registration information associated with the second electronic device, wherein the registration information associated with the second electronic device includes the unique user identifier associated with the user at the messaging server, the second electronic device having a second messaging address unique to the second electronic device and used to transmit messages to the second electronic device, the second messaging address different than the first messaging address;
   determining at the messaging server whether the first electronic device and the second electronic device share the unique user identifier, wherein if the first electronic device and the second electronic device share the unique user identifier, the unique device identifier associated with the second device is linked to the unique device identifier and the unique user identifier associated with the first electronic device through the one-to-many relationship and stored at the messaging server, wherein the devices having linked unique device identifiers comprises a message delivery group; and
   communicating messages transmitted via a communication medium and addressed to any one of the messaging addresses of the devices in the message delivery group to each of the devices in the message delivery group.

2. The method of claim 1, wherein at least one of the first unique device identifier and the second unique device identifier are automatically transmitted to the messaging server without user input.

3. The method of claim 1, wherein at least one of the first unique device identifier and the second unique device identifier are manually entered by the user and transmitted to the messaging server.

4. The method of claim 1, wherein at least one of the first unique device identifier and the second unique device identifier are telephone numbers.

5. The method of claim 1, wherein at least one first unique device identifier and the second unique device identifier includes one selected from a group consisting of International Mobile Equipment Identity (IMEI) number or an Integrated Circuit Card ID (ICCID) number.

6. The method of claim 1, wherein the unique user identifier is automatically transmitted to the messaging server without user input.

7. The method of claim 1, wherein the unique user identifier is manually entered by the user and transmitted to the messaging server.

8. The method of claim 1, wherein the unique user identifier is a verified identification associated with the user.

9. The method of claim 1, further comprising:
   receiving a delete message command corresponding to a delivered message from the first electronic device or the second electronic device; and
   deleting the message from a message queue associated with the other of the first electronic device or the second electronic device.

10. The method of claim 1, wherein the step of determining includes comparing the unique user identifier associated with the first electronic device and the second electronic device.

11. The method of claim 1, wherein prior to the step of communicating messages, a query is displayed on a display of the second electronic device to the user, wherein the query requests whether the user desires to synchronize messages at second electronic device with the first electronic device.

12. The method of claim 1, wherein the application server receives user information indicative of the user's response to the query and stores a suitable indication on the messaging served linked with the user's unique user identification.

13. The method of claim 1, wherein the first unique device identifier is the same as the first messaging address and the second unique device identifier is the same as the second messaging address.

14. The method of claim 13, wherein the first and second messaging addresses are telephone numbers of the respective devices.

15. The method of claim 1, wherein the first and second messaging addresses are telephone numbers of the respective devices.

* * * * *